United States Patent
Kallevig et al.

(10) Patent No.: US 7,337,600 B2
(45) Date of Patent: *Mar. 4, 2008

(54) GRASS STRIPING APPARATUS FOR USE WITH LAWN VEHICLE

(75) Inventors: Jeffrey B. Kallevig, Eden Prairie, MN (US); Jerrod N. Winter, Cottage Grove, MN (US)

(73) Assignee: The Toro Company, Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/364,389

(22) Filed: Feb. 27, 2006

(65) Prior Publication Data

US 2006/0144029 A1     Jul. 6, 2006

Related U.S. Application Data

(63) Continuation of application No. 10/860,551, filed on Jun. 3, 2004, now Pat. No. 7,024,845.

(51) Int. Cl.
*A01D 34/03* (2006.01)
*A01D 34/43* (2006.01)
*A01D 34/64* (2006.01)

(52) U.S. Cl. ..................................................... 56/17.4
(58) Field of Classification Search ................. 56/17.4, 56/320.1, 17.1, 256, DIG. 9, DIG. 20, DIG. 24; 172/13, 15, 17, 20
See application file for complete search history.

(56) References Cited

U.S. PATENT DOCUMENTS

| 780,964 | A | | 1/1905 | Moennighoff |
| 2,143,402 | A | * | 1/1939 | Baker ........................... 56/249 |
| 2,268,250 | A | * | 12/1941 | Gromley et al. ......... 56/400.14 |
| 2,578,880 | A | | 12/1951 | Doyle |
| 2,660,018 | A | * | 11/1953 | Clemson ....................... 56/249 |
| 2,751,741 | A | * | 6/1956 | Carson .................... 56/400.04 |
| 2,963,842 | A | | 12/1960 | Estes |
| 3,106,812 | A | * | 10/1963 | McDonagh ................ 56/320.1 |
| 3,126,689 | A | | 3/1964 | Walker et al. |
| 3,190,061 | A | | 6/1965 | Gilbertson |
| 3,226,920 | A | | 1/1966 | Gilbertson |
| 3,378,995 | A | | 4/1968 | Welsh |
| 3,432,183 | A | | 3/1969 | Groll |
| 3,525,201 | A | | 8/1970 | Kaufman |
| 3,715,875 | A | | 2/1973 | Brucker |
| 3,727,386 | A | | 4/1973 | Jespersen et al. |
| 4,134,249 | A | | 1/1979 | Wuerker et al. |
| 4,241,567 | A | | 12/1980 | Carolan |
| 4,322,938 | A | * | 4/1982 | Efflandt ..................... 56/320.2 |
| 4,378,668 | A | | 4/1983 | Gullett |
| 4,738,091 | A | | 4/1988 | Kulak et al. |
| 4,989,676 | A | | 2/1991 | Rogers |

(Continued)

*Primary Examiner*—Árpád Fábián Kovács
(74) *Attorney, Agent, or Firm*—Mueting, Raasch & Gebhardt, P.A.

(57) ABSTRACT

A grass striping apparatus for use with a lawn vehicle, e.g., a lawn mower. The striping apparatus may include a frame assembly operatively coupled to the vehicle, e.g., to a cutting deck of the vehicle, and a wiper member extending along a rear side of the cutting deck. The wiper member may include an upper edge fixed to the frame assembly, and an unsupported lower edge adjacent a grass surface. The wiper member may be made from a flexible material. The apparatus may also include an adjustment mechanism that permits height adjustment of the wiper member.

6 Claims, 5 Drawing Sheets

U.S. PATENT DOCUMENTS

| | | |
|---|---|---|
| 5,181,371 A | 1/1993 | DeWorth |
| 5,197,265 A | 3/1993 | Hiratsuna et al. |
| 5,311,727 A | 5/1994 | Fassauer |
| 5,331,794 A | 7/1994 | Reichle |
| 5,447,021 A | 9/1995 | Plamper et al. |
| 5,477,927 A | 12/1995 | Figura |
| 5,761,894 A | 6/1998 | Evans |
| 5,765,348 A | 6/1998 | Thagard et al. |
| 5,870,888 A | 2/1999 | Pugh |
| 6,161,637 A | 12/2000 | Decker et al. |
| 6,178,729 B1 | 1/2001 | Vastag |
| 6,394,216 B1 | 5/2002 | Gordon |
| 6,447,889 B2 | 9/2002 | Kulkaski |
| 6,832,468 B2 | 12/2004 | Weinlader |
| 6,962,039 B2 | 11/2005 | Greenhoe |
| 6,993,894 B2 | 2/2006 | Greenhoe |
| 7,024,845 B2 | 4/2006 | Kallevig |
| 7,069,711 B1 * | 7/2006 | Connell et al. ............... 56/249 |
| 2003/0230067 A1 | 12/2003 | Weinlader |

* cited by examiner

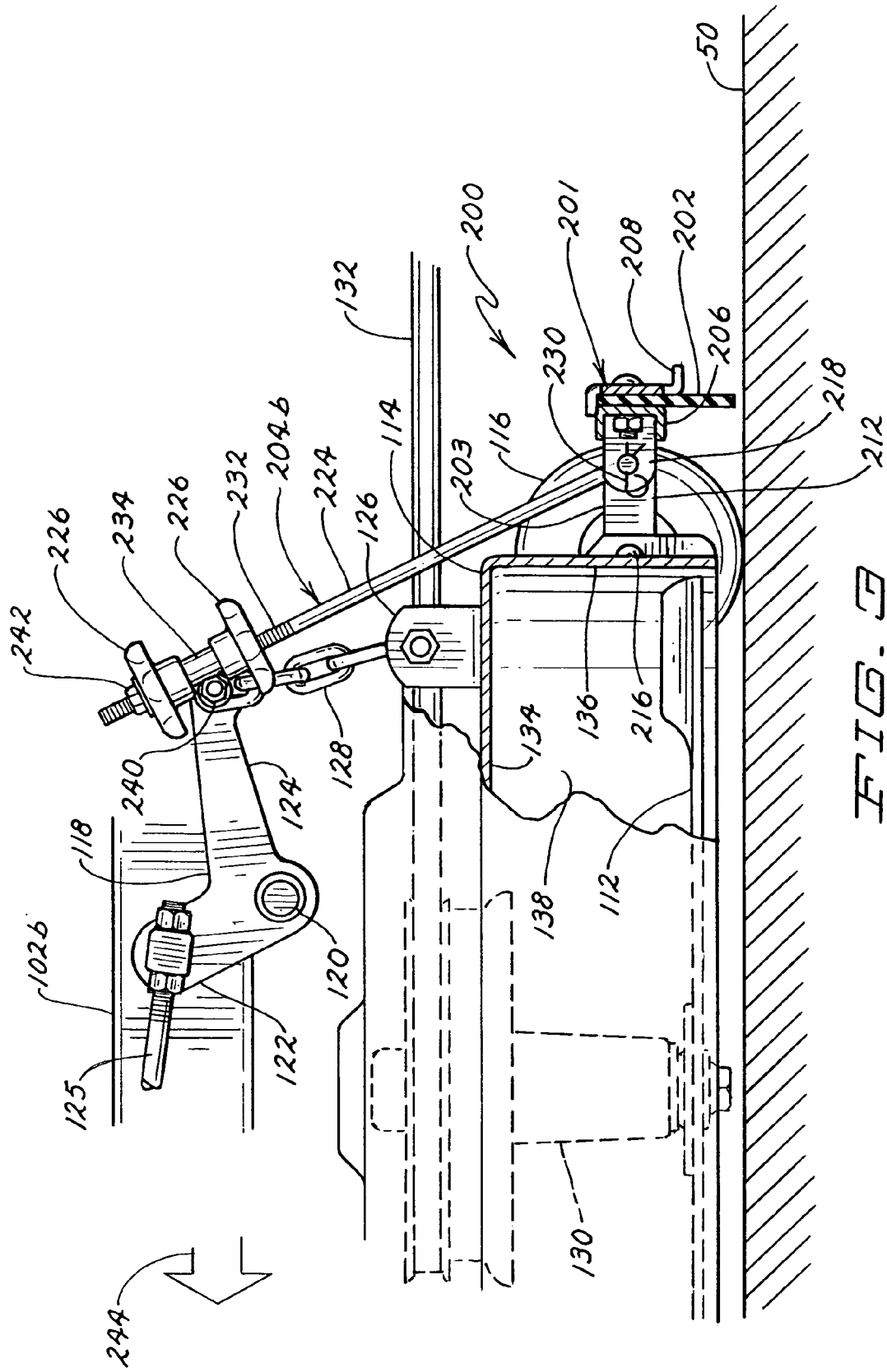

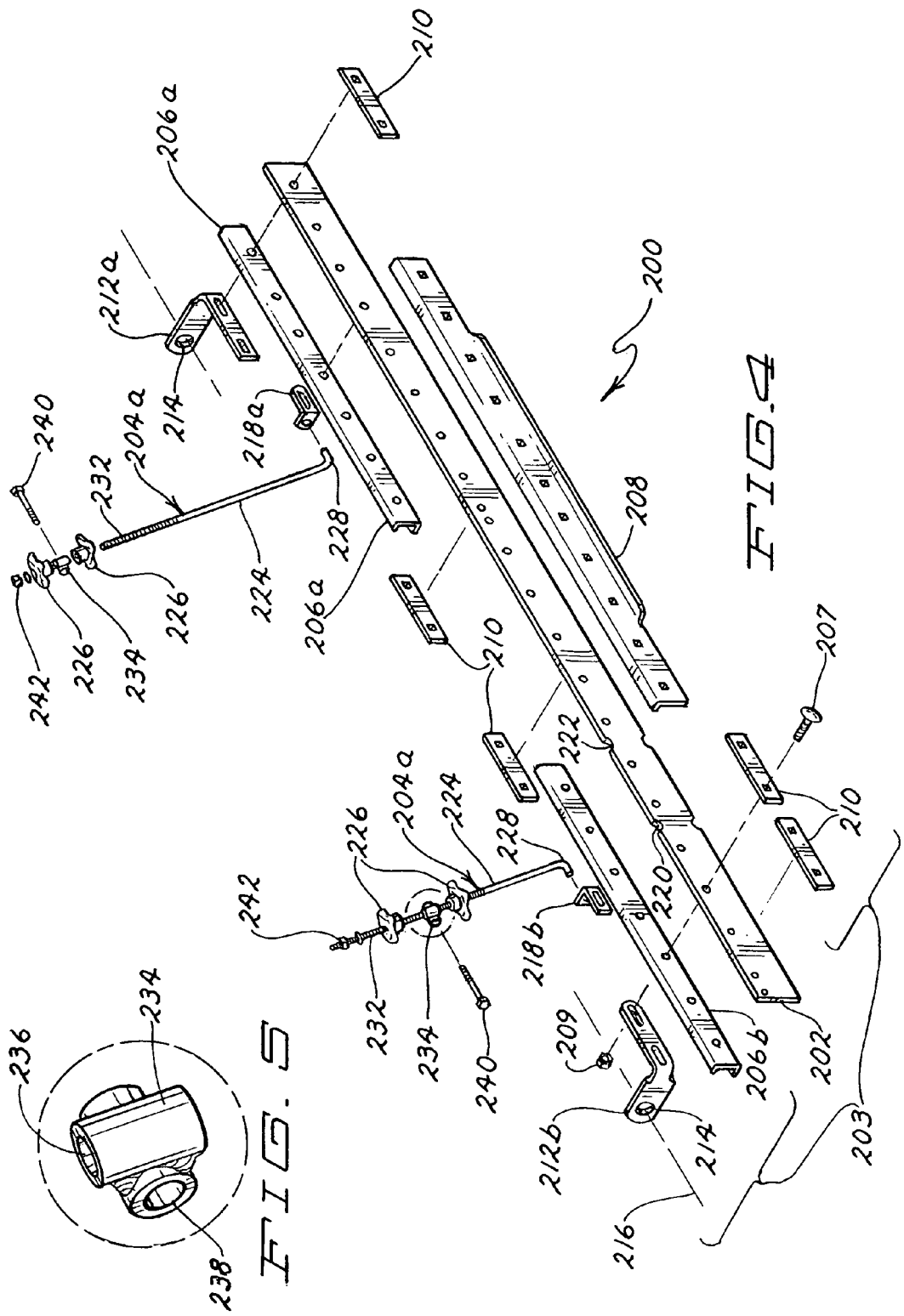

GRASS STRIPING APPARATUS FOR USE WITH LAWN VEHICLE

This is a continuation of application Ser. No. 10/860,551, filed Jun. 3, 2004, now U.S. Pat. No. 7,024,845 which is incorporated herein by reference in its entirety.

TECHNICAL FIELD

The present invention relates generally to lawn striping and, more particularly, to lawn striping apparatus attachable to lawn vehicles and methods of using the same, as well as to mower cutting decks incorporating such apparatus.

BACKGROUND

Grass or lawn striping is a grooming procedure used to orient grass to achieve a particular aesthetic effect. For example, striping is commonly used in professional ballparks to create a grass surface having a checkerboard or plaid pattern. Today, golf courses, municipal parks, and, to a lesser extent, homeowners, seeking to obtain a more manicured and professional lawn appearance are also incorporating striping techniques into their lawn care procedures.

In general, the striping effect may be achieved by bending blades of grass in controlled directions. An area of grass bent away from an observer, for example, may appear lighter than an area bent towards the observer. Often, a first strip of grass is bent in a first direction, while the immediately adjacent strip is bent in the opposite direction. This pattern may be repeated across an entire grass surface to achieve the desired effect.

Striping may typically be accomplished by rolling the grass, often in conjunction with a mowing operation. That is, a roller may be attached to a rear portion of a mowing vehicle to roll over and bend the grass in the direction of vehicle travel. Professional reel mowers, for example, may include a roller fixed to a rear side of each mower reel. Other mower configurations, e.g., riding rotary mowers, may include full width, rear-mounted rollers.

While these striping systems are effective, problems remain. For example, rollers are often heavy and/or rigidly fixed to the mower or cutting deck to ensure sufficient downward force is applied to produce the desired striping effect. However, heavy or full-width rollers, or those rigidly affixed to the vehicle, may inadvertently strike ground surfaces or obstacles, e.g., curbs, during operation, resulting in potential damage to the lawn surface and/or the roller. Moreover, current striping mechanisms often lack adjustability, i.e., they typically apply their full force or weight to the ground regardless of particular grass conditions, e.g., height. To alter the downward pressure of the striping mechanism often requires its removal from the mower or, alternatively, loosening and repositioning of the striping mechanism, typically with the use of tools.

SUMMARY

Embodiments of the present invention provide striping apparatus that address these and other issues. In one embodiment, a grass striping apparatus for use with a lawn mower having a cutting deck attached thereto is provided. The striping apparatus includes a frame assembly coupled to the cutting deck, and a flexible wiper member extending along a rear side of the cutting deck. The wiper member includes an upper edge fixed to the frame assembly, and an unsupported lower edge adjacent a grass surface.

In another embodiment, a grass striping apparatus for use with a lawn mower including a cutting deck is provided. The striping apparatus includes a frame assembly coupled to the cutting deck, and a flexible cantilevered wiper member extending along a rear side of the cutting deck. The wiper member includes an elongate upper edge fixed to the frame assembly, and an elongate, unsupported lower edge operable to drag over a grass surface. An adjustment mechanism is also included with the striping apparatus and includes a first portion attached to the frame assembly, and a second portion operatively coupled to the cutting deck.

In yet another embodiment, a grass striping apparatus for use with a lawn vehicle is provided wherein the striping apparatus includes a frame assembly pivotally coupled to the vehicle, and an elongate wiper member extending transversely across a width of the vehicle. The wiper member forms a cantilever structure comprising an elongate first edge fixed to the frame assembly, and an unsupported second edge proximate a grass surface.

The above summary of the invention is not intended to describe each embodiment or every implementation of the present invention. Rather, a more complete understanding of the invention will become apparent and appreciated by reference to the following detailed description and claims in view of the accompanying drawing.

BRIEF DESCRIPTION OF THE VIEWS OF THE DRAWING

The present invention will be further described with reference to the figures of the drawing, wherein:

FIG. 3 is a partial side elevation view of the cutting deck and striping apparatus of FIG. 2 with some structure removed for clarity;

FIG. 4 is an exploded perspective view of the striping apparatus of FIGS. 2 and 3;

FIG. 5 is an enlarged view of a portion of the striping apparatus of FIG. 4;

Figure 1:
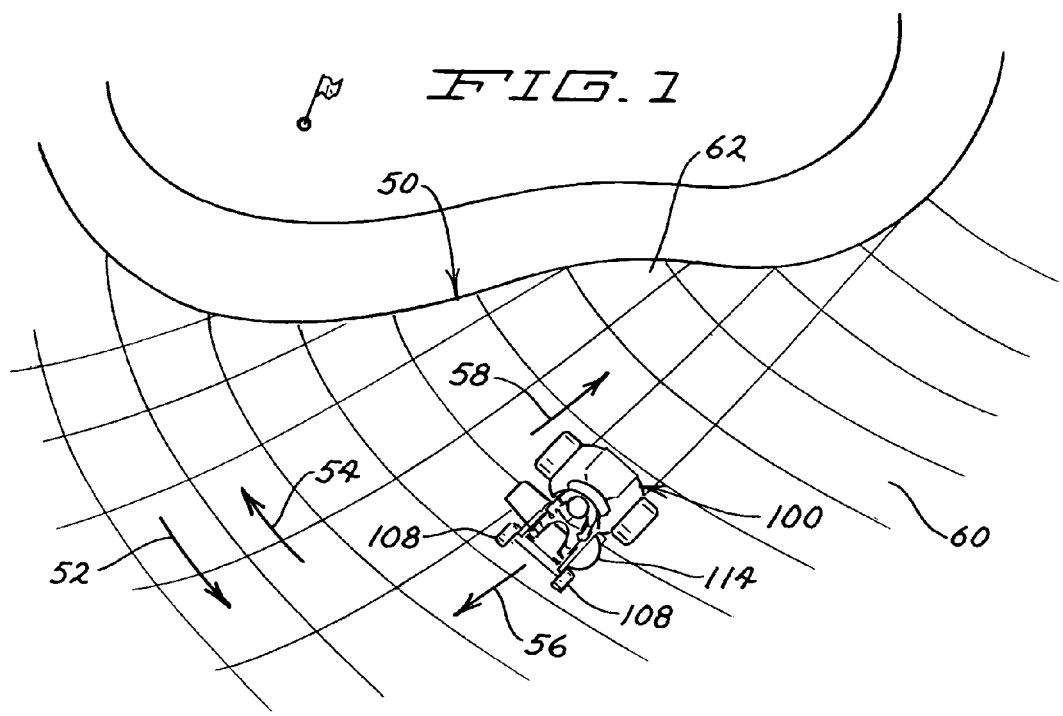
FIG. 1 is a top plan view illustrating a striped grass surface that may be obtained with a grass striping apparatus and method in accordance with embodiments of the present invention.

Unless otherwise stated herein, the figures of the drawing are not necessarily rendered to scale.

DETAILED DESCRIPTION OF EXEMPLARY EMBODIMENTS

In the following detailed description of exemplary embodiments, reference is made to the accompanying views of the drawing which form a part hereof, and in which are shown by way of illustration specific embodiments in which the invention may be practiced. It is to be understood that other embodiments may be utilized and structural changes may be made without departing from the scope of the present invention.

Generally speaking, embodiments of the invention described herein are directed to grass striping apparatus/ methods, and to mower cutting decks incorporating the same. The grass striping apparatus embodiments described herein may include a grass-contacting wiper member that may be adjustably positioned relative to the cutting deck and to a grass surface. Moreover, the wiper member may be configured to be either substantially fixed relative to the cutting deck (e.g., move in unison with the deck) at an operator-selected position or, alternatively, to float (e.g., move independently) relative to the deck. Further, wiper members, as described herein, may be made from a relatively flexible and elastic material. As a result, damage to turf and/or the mower resulting from inadvertent contact between the wiper member and the grass surface may be reduced or eliminated.

FIG. 1 illustrates a plan view of a ground or grass surface 50 (e.g., a lawn) being groomed by a self-propelled, ground maintenance vehicle, e.g., riding lawn mower 100. The riding mower may, in one embodiment, include: a cutting deck 114 operable to cut grass over which the deck passes; and a grass striping apparatus 200 operable to stripe the surface 50 as further described below (both the deck 114 and the striping apparatus 200 are shown more clearly in FIG. 2).

While the invention is herein described with respect to riding mowers, those of skill in the art will realize that the invention may be applicable to other mowing vehicles, e.g., walk-behind mowers, towed and gang mowers, etc., and to other vehicles to which a cutting deck may be attached, e.g., all terrain vehicles, skid-steer loaders. Moreover, the striping apparatus 200 could also be utilized with vehicles that do not incorporate a cutting deck.

To generate a striped appearance, the mower 100 may traverse the surface 50 in an appropriate, alternating pattern. For example, the mower may, during a first mowing, travel along a first path 52. At the lawn perimeter, the mower 100 may reverse directions and travel along a second path 54 parallel to and adjacent the first path. This pattern may be repeated across the grass surface 50 to produced the desired alternating stripes 60.

During the next mowing, the same pattern may be used or, alternatively, the mower may travel along a third path 56 generally orthogonal to the first path 52. At the lawn perimeter, the mower 100 may reverse directions and travel along a fourth path 58 parallel to and adjacent the third path. By alternating passes across the grass surface in this fashion, the desired stripes 60 (or, after a second mowing, checkerboard squares 62) may be obtained.

Figure 2:
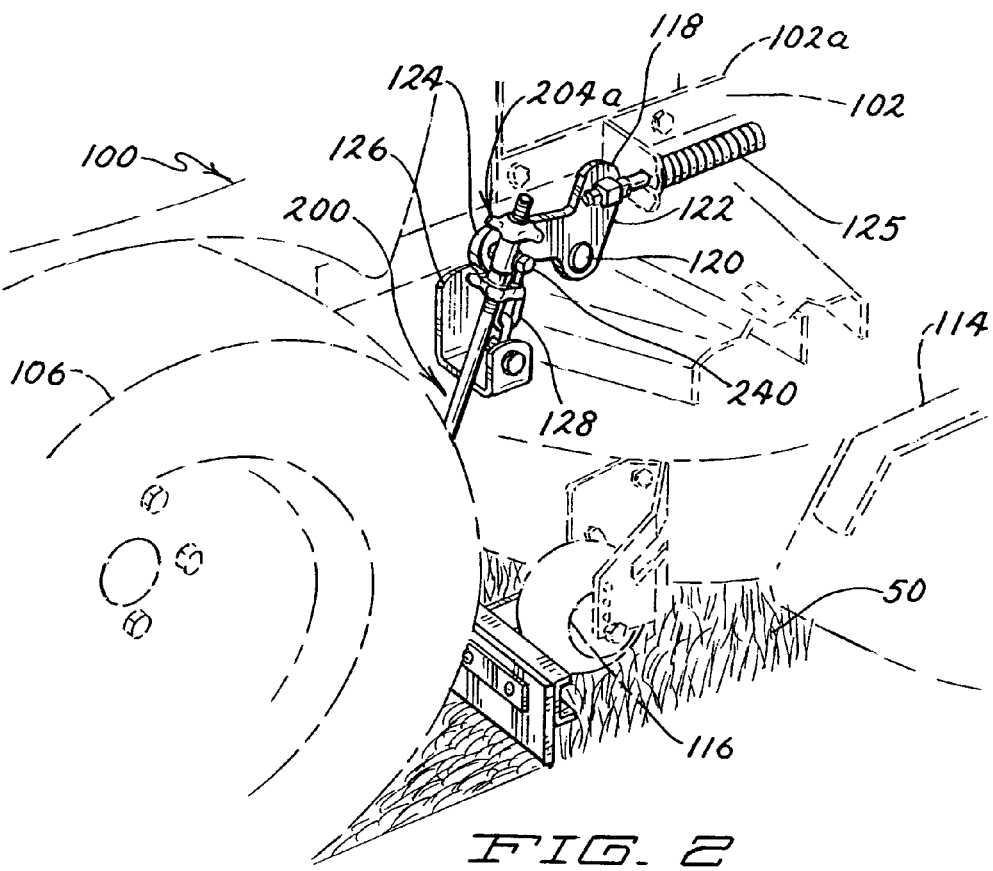
FIG. 2 is a partial perspective view of a lawn vehicle, e.g., mower, having a cutting deck incorporating a grass striping apparatus in accordance with one embodiment of the present invention.

While the general mower configuration is not necessarily central to the invention, FIG. 2 illustrates partial right side perspective view of the exemplary mower 100 of FIG. 1. The mower may include a frame 102 (of which a portion 102a is visible) supporting a prime mover, e.g., internal combustion engine (not shown). A left and a right ground engaging drive wheel 106 (only right wheel shown) may be rotatably coupled to left and right sides of a rear portion of the mower 100, respectively. The drive wheels 106 may be independently powered by the engine (e.g. via one or more hydraulic motors, transmissions, or the equivalent) so that they may propel the mower 100 over the grass surface 50 and control the mower's direction.

The mower 100 may, in one embodiment, be a zero-turning-radius mower, such as that described in U.S. Pat. No. 6,161,637 to Decker et al. Accordingly, a pair of front swiveling caster wheels 108 (see FIG. 1) connected to the frame 102 may support a front portion of the mower 100 in rolling engagement with the grass surface 50.

Although the illustrated mower has the drive wheels 106 in the rear, this configuration is not limiting. For example, other embodiments may reverse the location of the wheels, e.g., drive wheels in front and caster wheels in back. Moreover, other configurations may use different wheel configurations altogether, e.g., a tri-wheel configuration or a conventional front-wheel-steering configuration. Accordingly, other embodiments are possible without departing from the scope of the invention.

The cutting deck 114 may be mounted, in one embodiment, to the lower side of the frame 102, generally between the drive wheels 106 and the caster wheels 108. The cutting deck 114 may include one or more cutting blades 112 (as shown in FIG. 3) that are operatively powered by the engine. During operation, power is selectively delivered to the cutting deck 114 and the drive wheels 106, whereby the cutting blades 112 rotate at a speed sufficient to sever grass and other vegetation as the cutting deck passes over the grass surface 50. The cutting deck 114 may further include deck rollers 116 to assist in supporting the cutting deck relative to the grass surface 50.

Typically, the cutting deck 114 includes an operator-controlled deck lift mechanism to allow adjustment of the cutting deck elevation above the grass surface 50. While the lift mechanism configuration may vary, it may, in the embodiment illustrated in FIG. 2, include a cutting deck lift arm 18 pivotally attached to the frame 102 at a pivot 120 (a similar lift mechanism may be provided on the opposite side and/or proximate the front of the deck 114). A first arm 122 of the lift arm 118 may be coupled to a link 125 that may be moved in an axial direction and selectively locked in any one of multiple locations by the operator. A second arm 124 may be coupled to the deck 114 (e.g., to a bracket 126 attached to the deck) with a tension member such as a chain 128. When the operator causes the link 125 to move (e.g., forward or backwards), the lift arm 118 may rotate, effectively raising (or lowering) the cutting deck 114.

FIG. 3 is an enlarged left side elevation view of a portion of the mower 100 and cutting deck 114 of FIG. 2 with a portion of the deck cut-away. The cutting deck 114 may include one or more, e.g., three spindles 130, each driving separate cutting blades 112. The spindles 130 may receive power from the engine via one or more endless belts 132. The deck 114 may form a downwardly opening housing defined by a first or upper surface 134 and one or more sidewalls 136 extending from the upper surface. Each cutting blade 112 may rotate within a cutting chamber 138 that may be defined, in part, by the upper surface 134 and the sidewalls 136.

In accordance with embodiments of the present invention, the cutting deck 114 may further include the grass striping apparatus 200. In the illustrated embodiments, the apparatus 200 may include at least one elongate wiper member 202 and a frame assembly 203 for supporting the wiper member. Preferably, the wiper member 202 extends along, and proximate to, a portion of the rear side of the cutting deck 114. At least one adjustment mechanism 204 (mechanisms 204a and 204b) may also be provided for positioning the wiper member 202 relative to the cutting deck 114 and the grass surface 50.

The suffixes "a" and "b" may be used throughout this description to denote various left and right side parts/features, respectively. However, in most pertinent respects, parts/features denoted with "a" and "b" suffixes are either substantially identical to, or mirror images of, one another. Therefore, such items may, where appropriate, be referred to generically or collectively without the suffix. Moreover, it is understood that, unless otherwise noted, the description of an individual part/feature, e.g., the description of a part/feature identified with an "a" suffix, also applies to the opposing part/feature, e.g., the part/feature identified with a "b" suffix.

Moreover, as used herein, relative terms such as "left," "right," "fore," "forward," "aft," "rearward," "top," "bottom," "upper," "lower," "horizontal," "vertical," and the like are from the perspective of one operating the mower 100 while the mower is in a normal operating configuration, e.g., while the mower 100 is positioned such that the wheels 106 rest upon the horizontal grass surface 50. These terms are used herein to simplify the description, however, and not to limit the scope of the invention in any way.

FIG. 4 is an exploded perspective view of the exemplary striping apparatus 200 (some miscellaneous hardware removed for clarity) of FIGS. 2 and 3. As stated above, the frame assembly 203 may include those components of the apparatus that support the wiper member 202 and allow it to couple to the mower 100. For example, the frame assembly 203, in the illustrated embodiments, may include clamp members, (e.g., first or front clamp members 206a and 206b, and second or rear clamp member 208). The clamp members 206 and 208 may hold or secure the wiper member 202 in place. The frame assembly 203 may further include fasteners, e.g., carriage bolts 207 (only one shown), that may pass thorough various aligned openings in the clamp members 206, 208, and the wiper member 202 and fasten with a nut 209 to secure the components relative to one another. To support and provide tear-out resistance to portions of the wiper member 202 that may not be covered by the clamp members 206, 208, the frame assembly 203 may further include support plates 210.

When the wiper member 202 is attached to the frame assembly 203 with the bolts 207, the wiper member 202 may preferably be held firmly in place proximate its elongate, first or upper edge as shown in FIG. 3. An elongate, second or lower edge (the edge adjacent the grass surface 50), however, remains preferably free (unsupported) and operable to drag over the grass surface 50. That is, the wiper member 202 preferably forms a cantilevered structure fixed at its upper edge.

The frame assembly 203 (e.g., the clamp members 206, 208 along with the optional support plates 210 and fasteners 207, 209) and wiper member 202 may together form a wiper assembly 201 as shown in FIG. 3. To attach the wiper assembly 201 to the mower 100 (e.g., to the cutting deck 114), the frame assembly 203 may further include mounting brackets 212. In the illustrated embodiments, the mounting brackets 212 may each include an opening 214 to permit pivotal attachment to axles of one or more deck rollers 116. Thus, the wiper assembly 201 (e.g., the wiper member 202) when attached to the cutting deck 114, may pivot about a transverse rotational axis 216 of the deck rollers 116.

The frame assembly 203 may further include coupling members, e.g., adjuster brackets 218a and 218b, to permit coupling to the mechanisms 204a and 204b, respectively, as further described below. While illustrated as attaching to a forward side of the front clamp members 206, the adjuster brackets 218 may, in other embodiments, attach in alternate locations, e.g., to the rear clamp member 208.

To permit use of the apparatus 200 with cutting decks 114 of varying widths (e.g., 52, 60 and 72 inch), components of the apparatus may be modifiable by an end user. For example, the apparatus 200 may be sold as a kit similar to that illustrated in FIG. 4. The kit, as supplied, may be designed to fit (extend across the full width of) a large cutting deck (e.g., a 72 inch deck). However, the wiper member 202 may be trimmed to a shorter length for attachment to smaller decks. To assist the user in trimming the wiper 202, it may include notches 220, 222 (or other demarcations), which are located at the correct length for various smaller narrower decks, e.g., 60 and 52 inch decks.

Similarly, other components such as the mounting brackets 212 and adjuster brackets 218 may be flipped, relocated (e.g., moved towards center), or even replaced, for mowers of smaller widths. For example, in the illustrated embodiments, the front clamp members 206 may be moved towards one another when the apparatus 200 is used with smaller decks. As a result, some of the support plates 210, e.g., the center support plates shown in FIG. 4, may be discarded when used with narrower decks. In other embodiments, a single front clamp member could replace the dual arrangement illustrated in the figures. Such a clamp member could be trimmed, or replaced, for use with smaller decks.

The adjustment mechanisms 204 may permit adjustment of the wiper assembly 201 relative to the mower 100 and grass surface 50. While illustrated as incorporating two mechanisms 204a and 204b, other embodiments may utilize more or less mechanisms without departing from the scope of the invention.

In the illustrated embodiments, each mechanism 204 may include an elongate member, e.g., a rod member 224. The rod member 224 may include a first portion (e.g., first end) operable to couple or attach to the frame assembly 203, e.g., to the adjuster bracket 218, and a second portion (e.g., second end) operable to couple to mower structure. In the illustrated embodiments, the second portion of the rod member 224 may couple indirectly to the cutting deck 114 by coupling to the lift arm 118, which is, in turn, attached to the deck via chains 128.

The second portion of the rod member 224 may include a threaded portion 232 operable to receive one or more threaded adjusters 226 as further explained below. The first end of the rod member 224, on the other hand, may be L-shaped, e.g., include a right-angle bend 228, operable to pass through an opening in the adjuster bracket 218 where it may be secured with a fastener (e.g., a hair pin 230 as shown in FIG. 3). The right-angle bend 228 may provide a pivotal connection between the rod member 224 and the wiper assembly 201.

A mounting pivot 234, of which an enlarged view is provided in FIG. 5, may be located over the threaded portion 232 between two threaded adjusters 226. The mounting pivot 234 may, in one embodiment, be formed as two tubes coupled together such that their longitudinal axes are offset from, and orthogonal to, one another. The mounting pivot 234, in the illustrated embodiments, may include a first clearance hole 236 operable to engage the threaded portion 232 of the rod member 224 with clearance, and a second clearance hole 238 operable to couple to the lift arm 118 (see also FIG. 3). In the illustrated embodiment, the second clearance hole 238 may receive therein, with clearance, a fastener 240 that secures the chain 128 to the lift arm 118. Preferably, the mounting pivot 234 may freely rotate about the fastener 240 when the fastener is tightened.

With this description of components of the exemplary apparatus 200, its operation, once installed on the mower 100, will now be described with reference primarily to FIGS. 3, 6, and 7. The position of the wiper assembly 201 about the axis 216 may be set and maintained by the adjustment mechanism(s) 204. For example, to set the location of the wiper assembly 201, the lower threaded adjuster 226 may be turned until it is at or near the lower end of the threaded portion 232. The upper threaded adjuster 226, which, due to the weight of the wiper assembly 201, is preferably in contact with a first upper side of the mounting pivot 234, may then be rotated in: a first direction to raise the wiper assembly (e.g., pivot the wiper assembly in a counterclockwise direction in FIG. 3); or in a second direction to lower the wiper assembly (e.g., pivot the wiper assembly in a clockwise direction). Stated alternatively, rotation of the upper threaded adjuster 226 about the rod member 224 may permit axial movement of the rod member 224 relative to the mounting pivot 234, effectively shortening or lengthening the distance between the mounting pivot and the wiper assembly 201.

When the wiper assembly 201 reaches the desired position, the lower threaded adjuster 226 may be rotated until it is in contact with a second lower side of the mounting pivot 234 as shown in FIG. 3. With the two threaded adjusters 226 tightened against the mounting pivot 234, the wiper assembly 201 may be generally fixed relative to the cutting deck 114. An optional jam nut 242 may be provided to prevent loosening of the upper threaded adjuster 226 during operation.

This adjustment technique may permit the wiper assembly 201 to move with the cutting deck 114. However, the operator may still change the position of the wiper assembly 201 independently of the deck 114 by manipulating the adjustment mechanism 204. Where necessary, the elevation of the wiper assembly 201 may be course-adjusted by changing the elevation of the deck roller 116.

If the operator prefers, the wiper assembly 201 may be configured to float relative to the deck 114. Floating permits placement of the wiper assembly 201 at a particular height above the grass surface 50, but allows it to move upwardly, independent of the cutting deck 114, when an obstruction is encountered. To permit floating of the wiper assembly 201, the lower threaded adjuster 232 may be moved away from the mounting pivot 234 (see FIG. 3), e.g., towards the lower end of the threaded portion 232.

Although not illustrated, the wiper assembly 201 could be additionally biased towards the ground surface when more ground pressure is desired. More ground pressure may be advantageous for certain turf conditions, e.g., shorter or dry grass. Such biasing could be achieved, for example, by placing an extension spring between the lower threaded adjuster 226 and the mounting pivot 234 (see FIG. 3). Alternatively, additional weight could be added to the wiper assembly 201.

Figure 6:
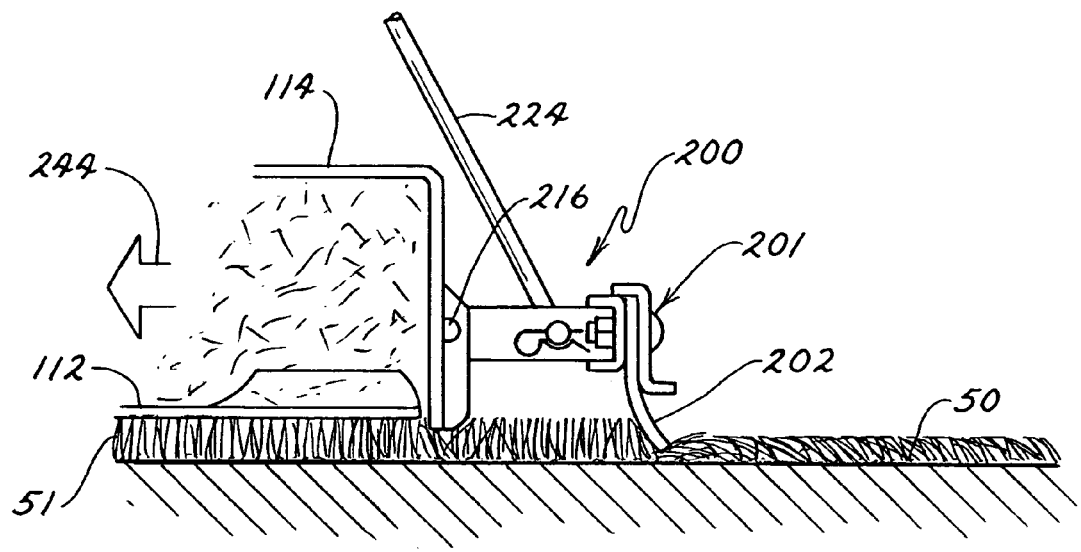
FIG. 6 is a diagrammatic side elevation view of the cutting deck of FIGS. 2 and 3 with the striping apparatus engaged with a grass surface.

With the lower edge of the wiper member 202 positioned at the desired location as shown in FIG. 6, e.g., about ¼ to about ½ inch below the bottom edge of the cutting deck 114, striping of the grass surface 50 may begin. If striping is combined with mowing, the cutting blades 112 may be activated and the mower 100 propelled in a forward direction 244. The blades 112 may cut grass 51 at a predetermined height above the grass surface 50. After the deck cuts the grass 51, the wiper member 202 may bend the grass in the direction of travel 244, producing the desired striping effect.

Figure 8:
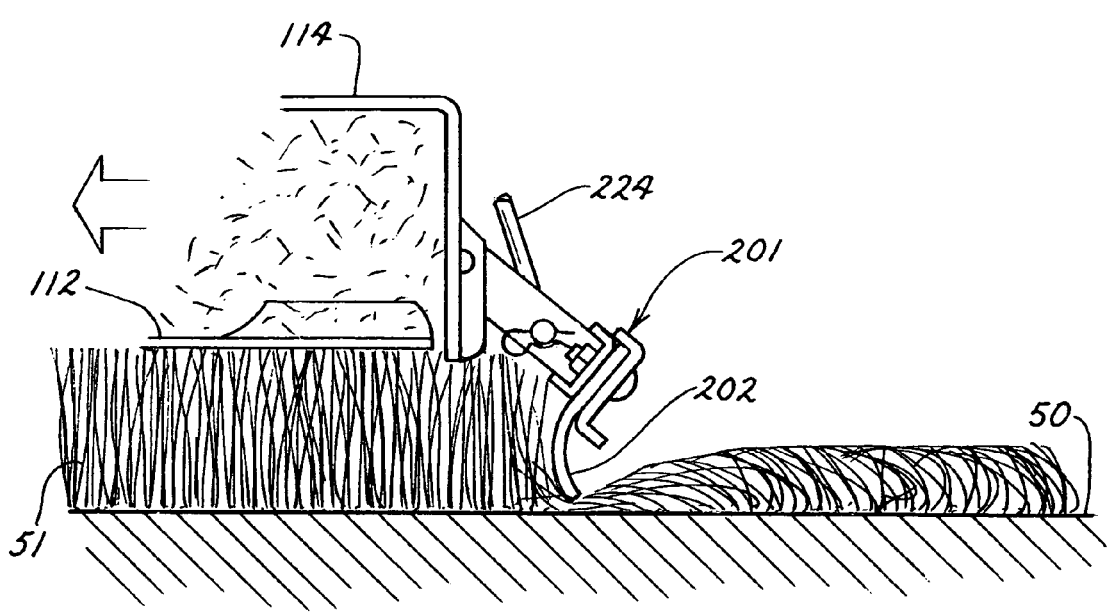
FIG. 8 is a diagrammatic side elevation view of the cutting deck of FIGS. 2 and 3 with the striping apparatus adjusted for tall grass mowing.

FIG. 8 illustrates an alternative operating mode for striping taller grass. In this mode, the cutting deck 114 may be adjusted such that the cutting blades 112 may be at a high mowing height, e.g., about 3.5 inches, and the wiper member 202 of the wiper assembly 201 may be set much lower, e.g., about 2.5 inches below the bottom edge of the deck 114. Such an adjustment may be accomplished by manipulating the adjustment mechanism(s), e.g., the rod member 224, as described herein. The mode illustrated in FIG. 8 may provide enhanced striping for tall grass lawns.

Figure 7:
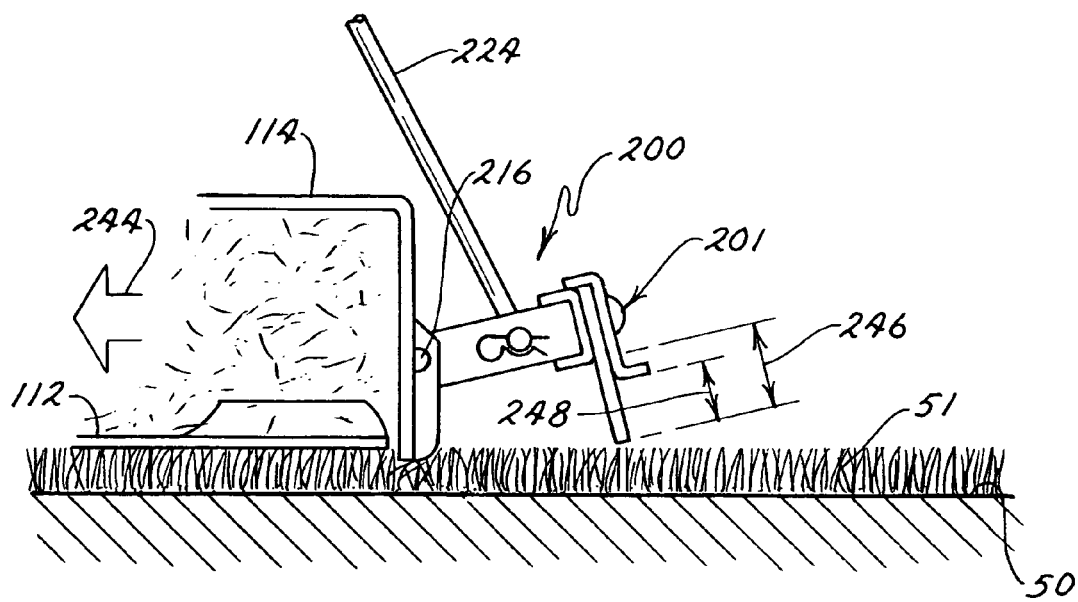
FIG. 7 is a diagrammatic side elevation view of the cutting deck of FIG. 6 with the striping apparatus adjusted to a higher elevation.

To terminate striping, the wiper assembly 201 may be selectively lifted from the grass surface 50 as shown in FIG. 7. This may be accomplished by turning both threaded adjusters 226 towards the lower end of the threaded portion 232 of the threaded rod 224, or by lifting the deck 114.

The wiper member 202 is illustrated herein as being in a substantially vertical plane when in a first, undeflected configuration as shown in FIG. 3. However, this configuration is not limiting. In fact, due to its pivotal connection to the deck 114, the plane of the wiper member 202 may often be tilted from vertical. In fact, as FIG. 8 illustrates, the wiper member 202 may be tilted at most any angle permitted by the geometry of the apparatus 200.

When the wiper member 202 is dragged across a grass surface 50, it may move to a second deflected configuration as shown in FIG. 6. In the second, deflected configuration, the lower edge of the wiper member 202 may move out of plane, e.g., may deflect rearwardly relative to its position when the wiper member is in the first, undeflected configuration of FIG. 3.

The wiper member 202 is preferably made from a flexible material that allows the wiper member to deflect as shown in FIGS. 6 and 8. The term "flexible," as used herein, indicates a relatively elastic and resilient material that can undergo substantial deflection, e.g., experience strain in excess of about 15%, and more preferably in excess of about 25%, without experiencing failure or substantial permanent set. Some materials that provide such flexibility may be selected from the group consisting of rubber and plastic. Alternative materials may include fabrics and foams. Flexibility of the wiper member 202 allows adequate and consistent contact with the grass 51 while reducing potential damage to the turf and/or the wiper as a result of wiper/turf contact.

The material properties and dimensions of the wiper assembly 201, e.g., wiper member 202, may be selected to ensure the desired amount of wiper deflection under normal operating conditions. For example, in one embodiment, the wiper member 202 may be made from rubber, e.g., neoprene rubber, having a durometer of about 60 Shore A, a thickness of about 0.28 inches, and a height (distance from top edge to bottom edge in FIG. 3) of about 3 inches. The width may vary depending on the cutting deck width. Moreover, the wiper may extend a distance 248 of about 1 inch to about 1.2 inches, e.g., about 1.14 inches, beyond the lower edge of the rear clamp member 208, and a second distance 246 of about 1.2 inches to about 1.4 inches, e.g., about 1.32 inches, beyond the lower edge of the front clamp member 206. This differential may provide for effectively greater stiffness of the wiper member 202 in the forward direction 244 than in a reverse direction. As a result, the tendency for the deck 114 to ride-up ("pole-vault") on the wiper member 202 when the mower is in reverse may be reduced. Those of skill in the art, however, will realize that properties and characteristics listed above are merely exemplary and that wipers and striping apparatus of most any size and material are certainly possible without departing from the scope of the invention.

Striping apparatus and methods as shown and described herein thus provide an effective and reliable technique for grooming a lawn surface. Moreover, because of their relative flexibility, wiper members of the present invention may also substantially reduce or prevent turf and/or deck damage resulting from wiper contact with the ground surface. Further, striping apparatus as described herein provide adjustment mechanisms that allow the operator to quickly and easily change the elevation of the wiper member, and to configure the wiper member in either a fixed configuration or a floating configuration. Wiper members as shown and described herein may also be easily modified by the end user to fit mowers/decks of varying widths.

The complete disclosure of the patents, patent documents, and publications cited in the Background section, the Detailed Description of Exemplary Embodiments section, and elsewhere herein are incorporated by reference in their entirety as if each were individually incorporated.

Exemplary embodiments of the present invention are described above. Those skilled in the ail will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. A grass striping apparatus for use with a lawn mower having a cutting deck mounted thereon, the striping apparatus comprising:
    a frame assembly pivotally coupled to the cutting deck;
    a wiper member extending transversely across a rear side of the cutting deck, the wiper member defined by both an upper edge clamped to the frame assembly, and a cantilevered lower edge; and
    an adjustment mechanism operatively attached at a first end to the frame assembly and, at a second end, to a portion of a deck lift mechanism, the adjustment mechanism configurable to adjustably limit, relative to the cutting deck, a lowermost elevation of the cantilevered lower edge, wherein the adjustment mechanism comprises a tie rod having: a first end attached to the frame assembly; and a second end attached to one or more threaded adjusters associated with the deck lift mechanism.

2. The apparatus of claim 1, wherein the adjustment mechanism is configurable to adjustably limit the lowermost elevation of the cantilevered lower edge to any one of a plurality of elevations.

3. The apparatus of claim 1, wherein the frame assembly comprises a front clamp member and a rear clamp member positionable on opposite sides of the wiper member.

4. The apparatus of claim 1, wherein the adjustment mechanism further comprises a second tie rod having: a first end attached to the frame assembly; and a second end attached to one or more second threaded adjusters associated with the deck lift mechanism.

5. The apparatus of claim 1, wherein the wiper member comprises a flexible sheet.

6. The apparatus of claim 5, wherein the flexible sheet comprises a material selected from the group consisting of rubber and plastic.

* * * * *

UNITED STATES PATENT AND TRADEMARK OFFICE
CERTIFICATE OF CORRECTION

PATENT NO. : 7,337,600 B2
APPLICATION NO. : 11/364389
DATED : March 4, 2008
INVENTOR(S) : Jeffrey B. Kallevig It is certified that error appears in the above-identified patent and that said Letters Patent is hereby corrected as shown below:

On the Title Page, item [75] under Inventors, please delete "Jerrod N. Winter, Cottage Grove, MN (US)"

Signed and Sealed this

Seventh Day of April, 2009

JOHN DOLL
*Acting Director of the United States Patent and Trademark Office*